United States Patent [19]

Wildhaber

[11] 4,079,598

[45] Mar. 21, 1978

[54] FLEXIBLE-DISC COUPLING

[76] Inventor: Ernest Wildhaber, 124 Summit Dr., Rochester, N.Y. 14620

[21] Appl. No.: 739,255

[22] Filed: Nov. 5, 1976

[51] Int. Cl.² .............................................. F16D 3/78
[52] U.S. Cl. ...................................... 64/13; 64/15 R; 64/15 B; 64/27 L
[58] Field of Search .................. 64/13, 14, 27 L, 15 B

[56] References Cited

U.S. PATENT DOCUMENTS

| 3,041,857 | 7/1962 | Anderson | 64/13 |
| 3,808,837 | 5/1974 | Anderson et al. | 64/13 |
| 3,959,988 | 6/1976 | McNamee | 64/13 |
| 3,988,907 | 11/1976 | Bohn et al. | 64/13 |

Primary Examiner—Benjamin W. Wyche
Assistant Examiner—R. C. Turner

[57] ABSTRACT

This flexible-disk coupling contains at least one disk connected at its outside with one and on its inside with the other of two rotary parts. The side profiles of said disks are true circular arcs whose radius is at least twice the outside diameter of said disks. A very smooth finish is obtainable on the side surfaces of the disks with a rotating tool that has line contact with a portion of the disk profile, by feeding said tool in a principally radial direction over the disk surface as the disk turns.

When the tool is a grinding wheel, its grinding surface is preferably part of a sphere whose radius equals the radius of said arcs but whose wheel DIAMETER is smaller than said RADIUS.

4 Claims, 8 Drawing Figures

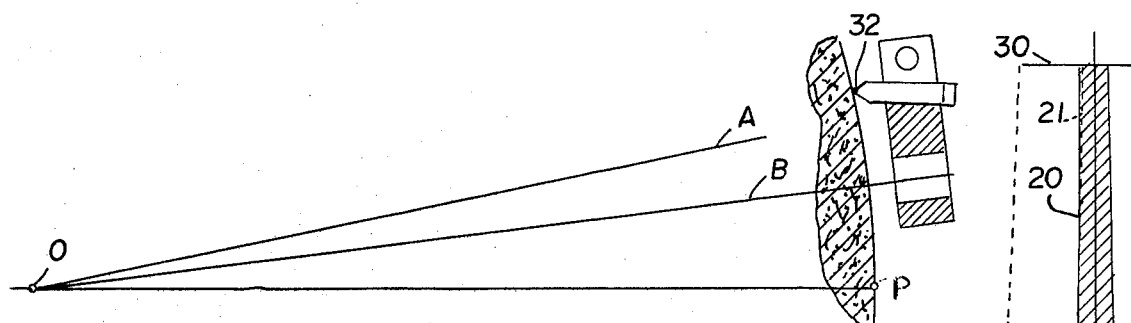
FIG. 2
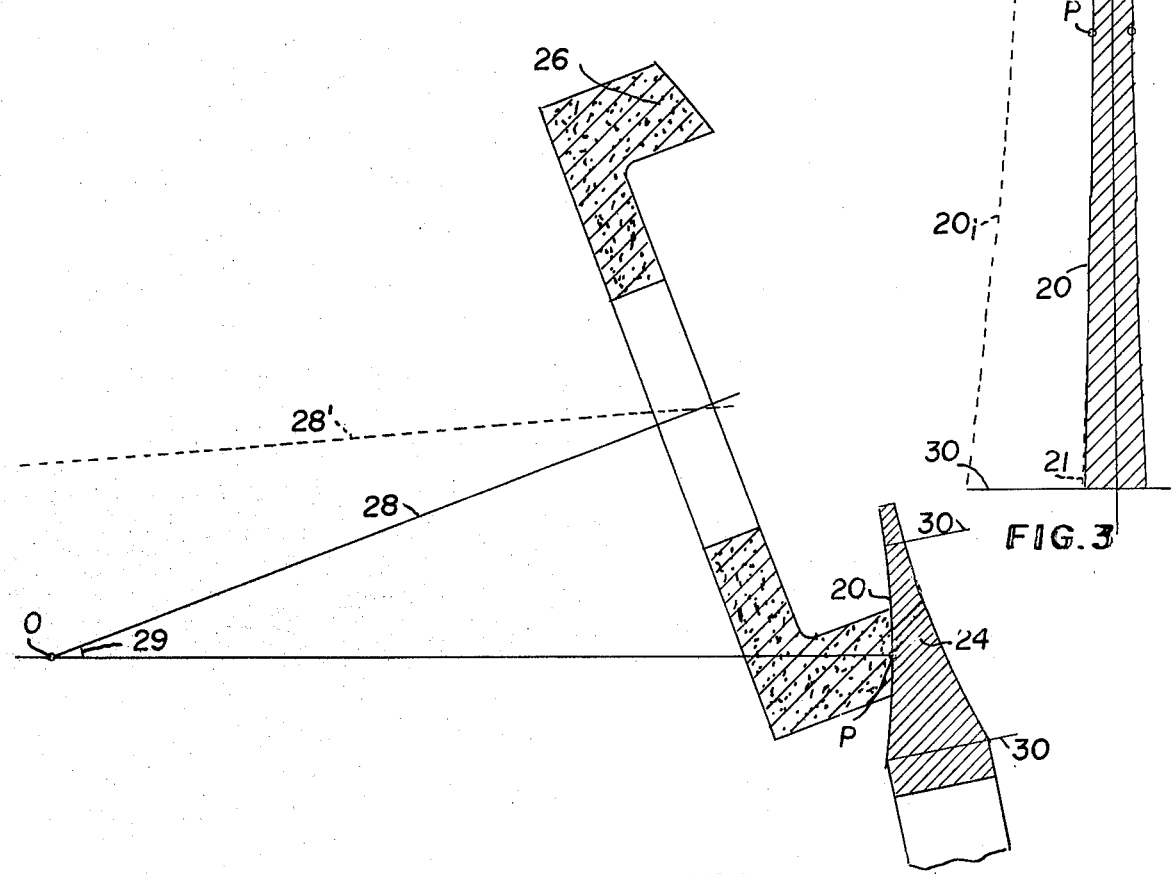
FIG. 3
FIG. 1

FLEXIBLE-DISC COUPLING

Couplings with flexible disks of ample radial extent and slightly concave profiles are known. Their radii of profile curvature increase sharply with increasing radii of the disks. The grinding wheels used in their production have essentially point contact with the side surfaces of the disks. They complete the disk sides in a feed motion principally radial of the disks.

The circular arc profiles of the invention permit true line contact. Contact is preferably established with a limited portion of the entire working profile. Feed motion is used to cover the whole profile. In this way each profile point is covered not merely by a point of the grinding profile, but by a whole range of points, by a line portion thereof. This produces am improved finish. As the stresses are generally largest at the outside surfaces, the improved finish permits somewhat larger stresses.

An asset of circular-arc profiles is the simple motion about a center point, to describe it. While this usually makes for higher accuracy, this center point is here at such a large distance from the workpiece that it is impractical to embody this point with an axis about which to feed the grinding wheel. The invention uses a wheel with a spherical grinding surface. Its radius equals the radius of said arc profile, but its axis is inclined at an acute angle to the plane of said profile and intersects said center point. This disposition decreases the grinding-wheel diameter to less than the profile radius. It results in a generally face-type wheel and provides an exact production of the circular arc profile.

The invention will be described in connection with the accompanying drawings, in which FIG. 1 is an axial section of a flexible disk used in the coupling and of a grinding wheel in engagement therewith. For convenience of illustration the grinding wheel is shown with too small a profile radius, to get its center on the drawing sheet.

FIG. 2 is a diagrammatic plane section taken along line OP of FIG. 1 at right angles to the drawing plane of FIG. 1. It shows axis OA about which the rotating grinding wheel is fed, and the axis OB of a wheel dresser.

FIG. 3 is an enlarged view of a circular-arc profile 20 in full lines, and of an (exaggerated) known varying-curvature profile 21 in dotted lines, both having the same curvature at mean point P.

Figure 4:
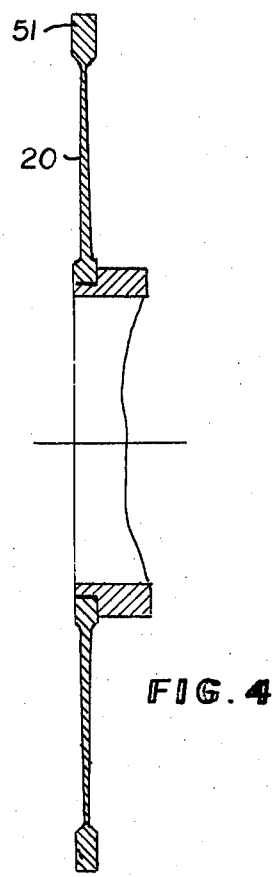
FIG. 4 is a fragmentary axial section of a disk of circular side profile, according to the invention, but otherwise shaped in known manner.

Referring now to the drawings, FIG. 1 shows disk 24 in a section taken along its axis 25. A face-type grinding wheel 26 is shown in engagement with a portion of circular-arc profile 20 centered at O. The wheel axis 28 preferably passes through center O. P denotes the mean point of grinding engagement. The proportions have been altered to keep center O on the drawing sheet. Center O should actually lie at the intersection of lines OP and dotted line 28'. The grinding surface is a portion of a spherical surface containing circular-arc profile 20. A suitable grinding-wheel diameter smaller than the radius of the spherical grinding surface is obtained with an axis 28 inclined at an acute angle 29 to the mean contact normal OP. It results in wheels of general face type, as shown.

The spherical grinding surface has line contact with the surface being produced on the disk. Preferably only a portion of the rather long disk profile is contacted at one time. Feed motion is used to spread the grinding contact over the entire length of the active profile. It extends between lines 30. The feed motion is about an axis OA, see FIG. 2. In the view of FIG. 1 OA coincides with OP.

This feed motion has the beneficial effect of spreading the contact at each profile point over the wheel profile or over part of it. It makes for a very smooth finish. The dressed wheel profile is generally not absolutely smooth. But whatever departure from smoothness exists is smoothed out by the feed.

This is not possible when grinding with point contact, as is done when the disk profile has a curvature varying along its length.

The spherical grinding surface may be trued with a diamond tool 32 (FIG. 2) that is only turned about an axis (OB) that intersects the sphere center O. In FIG. 1 OB coincides with OP. It is a simple and accurate dressing operation, with a dresser of moderate radius much smaller than the sphere radius.

Dresser 32 may be placed in any convenient position about the axis 28 of the grinding wheel. Disk 24 is omitted in FIG. 2.

Machines to achieve the required settings are in existence. Axis OA would be the horizontal cradle axis. The workpiece axis 25 would be turned about OA into a horizontal plane.

While disk-type grinding wheels with circular-arc profiles might also be used in place of face-type wheels 26, with an axis offset from O in the plane of FIG. 1, the more complicated dressing operation would be somewhat less accurate, as the arc center is at such a large distance from the disk being ground that it cannot be used as a pivot for dressing.

If desired, a circular-arc profile can be used also to approximate a desired profile of varying curvature, for instance one where the x-value parallel to the disk axis, defining half the varying thickness, is inversely proportional to the disk radius. A first approximation may consist of using an arc radius equal to the curvature radius at mean point P of the profile.

FIG. 3 shows the profiles in proper proportion at a large scale. Circular arc 20, shown in full lines, has the same curvature radius at mean point P as the profile 21 of varying radius, shown dotted. Arc 20 reaches slightly outside of curve 21 at the larger disk radii, and slightly inside thereof at the smaller radii. The departures are shown exaggerated in FIG. 3. If a still closer match is desired, the arc may be shifted along its tangent at P, cutting the maximum departures to about one third. However close matching is generally unnecessary.

To better show up the slightly concave disk profile, dotted curve 20i is drawn with its horizontal coordinates five times these of arc 20.

FIG. 4 is an axial section of a disk. It differs from known designs only by having true circular-arc profiles 20 that lend themselves to grinding with line contact, and to feed that overlaps the minute irregularities. The concavity of the shown profiles are hardly visible. They are shown in FIG. 3 at a larger scale.

Figure 5:
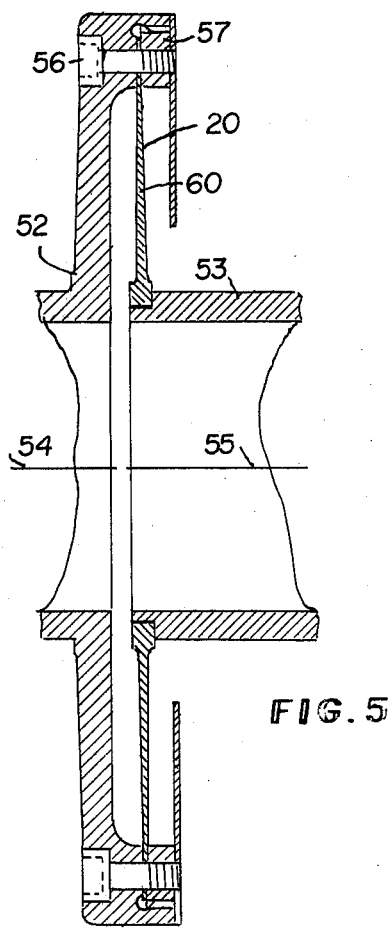
FIG. 5 is an axial section of a disk showing also parts of the two rotary members connected therewith.

Disk 60 shown in FIG. 5 also contains the circular-arc profiles, but lacks the heavy portion 51 at the outside. It connects two rotary parts 52, 53 with axes 54, 55 shown here in alignment without angularity. The coupling may be used conventionally in pairs. The outmost portion of disk 60 is clamped to part 52 by screws 56 with recessed heads, that thread into a cover 57 and reach through holes in said portion. The inmost portion of disk 60 may be welded or otherwise secured to a hollow shaft that is a portion of rotary part 53.

Figure 6:
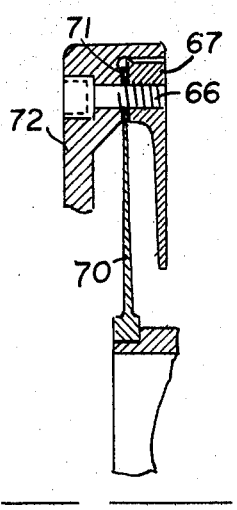
FIG. 6 is a similar axial section showing however the disk connected at the outside through thin sheets of rubber-like material with one coupling member, while being rigidly secured at the inside to the other coupling member of the pair.
Figure 7:
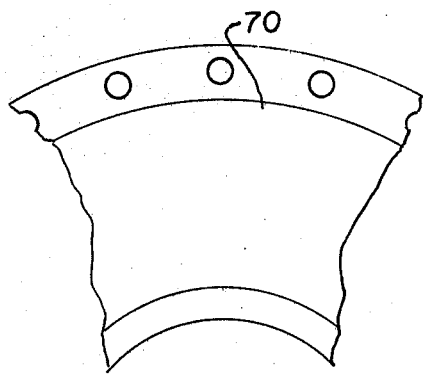
FIG. 7 is a fragmentary view, taken along its axis, of the disk shown in FIG. 6.

In the embodiment of FIGS. 6 and 7 disk 70 with circular arcuate profiles contains thin ring-shaped sheets of rubber-like material 71 bonded thereto on both sides adjacent their outside rim. Said sheets are indicated by heavy lines. The disk is pressed to part 72 by screws 66 with recessed heads. The screws extend through holes near the outside of disk 70, shown in FIG. 7, and thread into cover 67.

Figure 8:
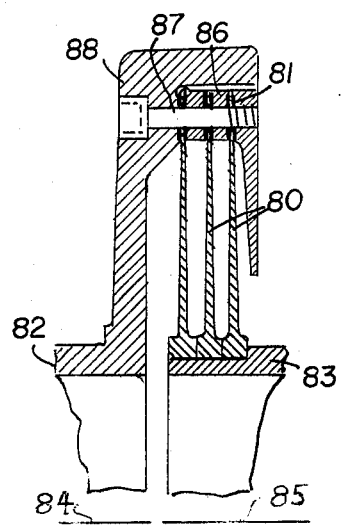
FIG. 8 is an axial section similar to FIG. 6, but having a plurality of closely adjacent disks.

FIG. 8 shows a disposition with multiple equal disks 80 of circular arcuate profile. Except for these profiles it corresponds to the design shown in my patent application "Flexing-Disk Coupling", Ser. No. 695,205, filed June 11, 1976. The disks 80 are rigidly secured to rotary part 83 with axis 85, as by welding. At their outside rubber-like sheets 81 are bonded to them on both sides, and may also be bonded to intermediate ringlike disks 86 reaching between them. Disks 86 engage teeth internally provided on an element 88 rigid with rotary part 82. The disks 80 and 86 are pressed against a shoulder of element 88 by screws 87.

The use of multiple disks 80 permits to reduce the diameter and weight of the coupling. And the rubber connection nearly equalizes the stresses in the several disks. It permits also a slight offset between the axes 84, 85. In some cases a single coupling may be used in place of a coupling pair.

Having thus described my invention, what I claim is:

1. A flexible-disk coupling containing at least one circular disk connecting two rotary parts,
    said disk being connected to one of said parts adjacent its outside periphery and to the other of said parts adjacent its inner periphery,
    each of the two opposite side profiles of any axial disk section being a single circular arc that extends radially through the entire deflecting portion of the disk,
    said opposite profiles being concavely curved in opposite directions and converging towards the outside of the disk,
    said arcs having profile radii larger than the outside diameter of said disk.

2. A flexible-disk coupling according to claim 1, wherein the side surfaces of said disk have a fine scratchless surface finish
    due to absence of curvature variation of the disk profiles, substantially as described in the specification.

3. A flexible-disk coupling according to claim 1, containing a plurality of adjacent metal disks bonded only near their outside periphery through sheets of rubber-like material to portions rigid with one of said two rotary parts, to more nearly equalize the stresses of the several disks.

4. A flexible coupling according to claim 1, wherein said two opposite side profiles are symmetrical to each other with respect to a mid-plane that is perpendicular to the disk axis, so that each profile is the mirror image of the other with respect to said mid-plane.

* * * * *